United States Patent [19]

Kanaoka et al.

[11] Patent Number: 4,508,438
[45] Date of Patent: Apr. 2, 1985

[54] SIDE PRINTING METHOD AND APPARATUS THEREFOR

[75] Inventors: Takeshi Kanaoka; Shigehisa Shimizu, both of Minami-ashigara, Japan

[73] Assignee: Fuji Photo Film Co., Ltd., Kanagawa, Japan

[21] Appl. No.: 503,581

[22] Filed: Jun. 13, 1983

[30] Foreign Application Priority Data

Jun. 15, 1982 [JP] Japan .................. 57-102384

[51] Int. Cl.³ .............................. G03B 17/24
[52] U.S. Cl. .................................... 354/105; 355/40
[58] Field of Search ............... 354/105, 109; 355/40

[56] References Cited

U.S. PATENT DOCUMENTS 4,384,771  5/1983  Sakurada et al. .................. 354/109

OTHER PUBLICATIONS 49-109480-Japanese Utility Model, publication date Sep. 19, 1974, w/translation.
51-107281-Japanese Utility Model, publication date Aug. 27, 1976, w/translation.
53-76929-Japanese Utility Model, publication date Jun. 27, 1978, w/translation.
56-38341-Japanese Utility Model, publication date Apr. 11, 1981, w/translation.
56-16589-Japanese Utility Model, publication date Apr. 17, 1981, w/translation.

*Primary Examiner*—Russell E. Adams
*Attorney, Agent, or Firm*—Young and Thompson

[57] ABSTRACT

A side printing apparatus for photographically exposing marks onto a strip of continuously moving photosensitive material as a latent image that includes a multielement luminous display unit with a plurality of light emitting elements arranged at regular intervals. The image of the displayed mark on the multielement luminous display unit is focused on the lengthwise moving photosensitive material through a reduction lens system. The light emitting elements are selectively driven to display different marks according to various types of photosensitive materials.

12 Claims, 9 Drawing Figures

SIDE PRINTING METHOD AND APPARATUS THEREFOR

BACKGROUND OF THE INVENTION

The present invention relates to a side printing method and an apparatus therefor for photographically exposing or entering identifying marks comprising characters, numerals, symbols, signs or the like or combinations thereof as a latent image on an unexposed filmstrip for motion pictures and still pictures and, more particularly, to a method and an apparatus which is suitable for photographically exposing a series of different marks comprising characters, numerals, symbols, signs, or combinations thereof on an unexposed filmstrip along its longitudinal margin.

In film manufacturing, identifying marks such as the name of the manufactuere, the date the film was manufactured, the type of film or other identifying data are photographically exposed onto an unexposed filmstrip as a latent image at positions between a series of perforations and a longitudinal edge of the filmstrip. The identifying mark exposing, which is generally known as side printing, appears as, in one case, a common mark on a longitudinal margin of a filmstrip at regular intervals and, in another case, different or consecutive numerals such as footage numbers on, for instance, a motion picture filmstrip at regular intervals.

In such side printing, conventionally, it has been usual to use a rotary printing drum for photographically exposing the identifying marks onto a filmstrip. The rotary printing drum includes a light source, for instance a lamp, therewithin and has a window which is formed at a certain position in the periphery thereof and which is provided with a film plate with a negative image of the mark to be photographically exposed onto the filmstrip. As the filmstrip is continuously advanced around the peripheral surface of the rotary drum, the image of the mark on the film plate is illuminated by the light source and thereby projected on the filmstrip, so that the mark is photographed onto the filmstrip. In the case that different marks are photographed onto a filmstrip at regular intervals, the rotary printing drum further includes, therein, a mark counter comprising a cylinder member with a plurality of windows each having a film plate with a negative image of the mark to be photographically exposed and surrounding a light source. With the advance of a filmstrip, the mark counter rotates so that different marks are projected in sequence on a filmstrip through an aperture formed in a cylindrical light shielding cover surrounding the mark counter and a window of the rotary printing drum and thereby photographed onto a margin of the filmstrip.

There has been proposed a different type of a side printing apparatus, as described in Japanese Utility Model Publication No. 56-16589, which comprises a mark plate with various marks recorded thereon, a plurality of lens systems forming images of the respective marks on a filmstrip and a plurality of LEDs for illuminating the respective marks. In the side printing apparatus, the LEDs are selectively activated to emit light according to the advanced length of a filmstrip which is detected by using a rotary encoder rotating simultaneously with the film advance and a counter for counting pulses from the rotary encoder so as to project a mark to be photographically exposed onto the filmstrip.

Mainly because of the construction having a mark plate or plates, for instance a negative film plate, with specified marks in both apparatus just mentioned, exposing various special marks requires another mark plate to be displaced, resulting in a cumbersome procedure. Furthermore, the provision of various kinds of mark plates entails difficultly in controlling the mark plates. And in conventional apparatus having no detecting means of a damaged light source, there is a greater possibility to be unsuccessful in printing marks on a filmstrip owing to a damaged light source.

OBJECTS OF THE INVENTION

It is a principal object of the present invention to provide a side printing method and an apparatus therefor wherein marks to be photographically exposed onto a filmstrip as a latent image can be easily displaced according to the film type and the film size.

It is another object of the present invention to provide a side printing method and an apparatus therefor wherein marks can be photographically exposed at a constant exposure.

It is a further object of the present invention to provide a side printing apparatus which is fairly easy to maintain.

It is a final object of the present invention to provide a side printing apparatus which is adapted to give warning if any one of the light emitting elements breaks down.

SUMMARY OF THE INVENTION

According to the present invention, the objects above mentioned are achieved by providing a multi-luminous element display device comprising a plurality of light emitting elements which are selectively momentarily activated to emit light so as to display any desired light mark in response to a sensor which senses a filmstrip portion where the mark is to be photographically exposed thereon through a reduction lens system.

In accordance with the present invention, a multi-luminous element display device allows an easy photographing of any desired mark on a filmstrip and the selective activation of the light emitting elements makes it easy and quick to display different marks to be photographed according to various types of film or the like, resulting in a remarkable increase in the rate of film production. As it will frequently be necessary to change marks in the case of diversified small-quantity production, the present invention is remarkably useful.

In accordance with a preferred embodiment of the present invention, a lamp or a buzzer gives warning when an anomalous current across the light emitting element is detected. Light emitting elements which emit no light or an extremely large quantity of light can be checked and then replaced so as to ensure marks photographed with a constant exposure.

It will be understood by those skilled in the art that the present invention is available not only in film producing and packaging processes and an assorting process before processing exposed films but also in printing processes in order to print the customer's names, the date, the kind of print, the ordered number of prints and the like at a processing laboratory.

BRIEF DESCRIPTION OF THE DRAWINGS

These and other objects and features of the present invention will become apparent from the following description taken in conjunction with the preferred embodiment thereof shown in the accompanying drawings, in which.

DETAILED DESCRIPTION OF THE INVENTION

Figure 1:
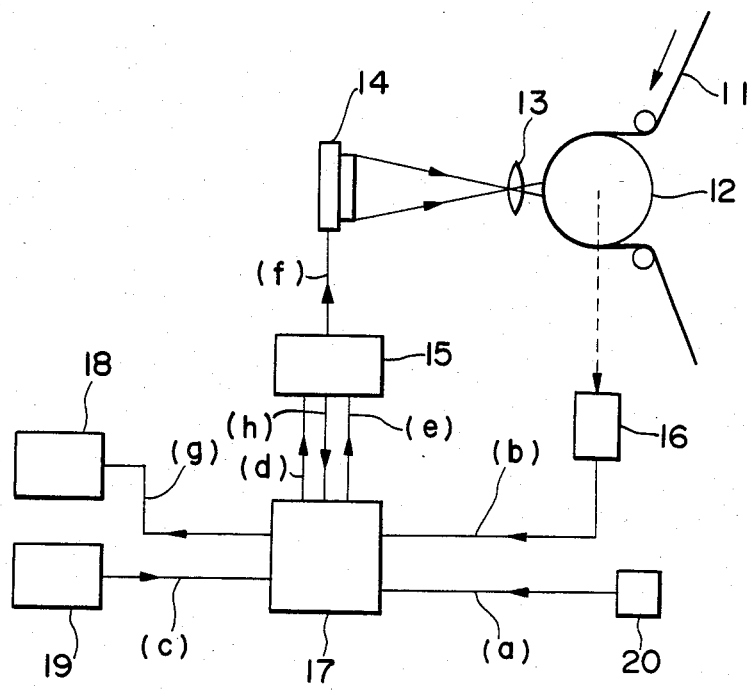
FIG. 1 is a block diagram of one preferred embodiment of a side printing system in accordance with the present invention.

Referring first to FIG. 1, photographic filmstrip 11 is advanced in the direction of an arrow by a rotary drum 12 to which a position sensor 16 is directly connected. The sensor 16 generates signals proportional to the advanced length of the filmstrip 11, while a syncronizing pulse generator 20 generates pulse signals at the start of every printing cycle. A mark setting device 19 is adapted to establish various marks, for instance characters, numerals, symbols and signs, to be photographed onto the filmstrip as a latent image by selectively operating keys. A main controller 17 has a memory where the information including the name of the film manufacturer, the date the film was manufactured, the type of film, the size of film, the emulsion number of the film or the like is stored and, in conjunction with digital signals from the mark setting device 19, signals from the sensor 16 and the start signals from the synchronizing pulse generator 20, generates signals for the display of a predetermined mark on a multi-element luminous display device 14. The signals from the main controller 17 are supplied to a driving unit 15 which can momentarily drive the multi-element luminous display device 14 so as to display a mark thereon. The image of the displayed mark is focused on the unexposed filmstrip continuously advanced around the rotary drum 12 through a reduction lens system 13 and then photographed thereon. The driving unit 15 includes a comparator, for instance a winding comparator, which supplies a signal (h) to the main controller 17 so as to cause a warning unit 18 to give a warning of anomaly if the comparator detects a driving current either higher than a predetermined level of current or lower than another predetermined level of current.

Figure 2:
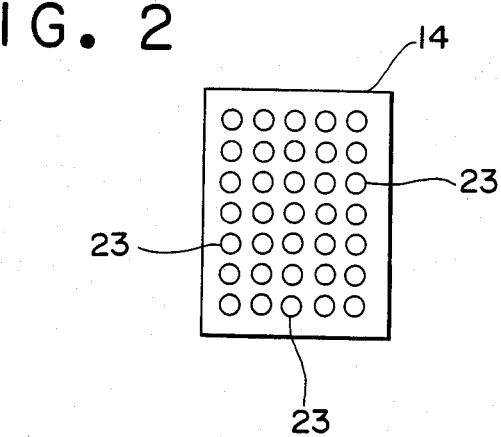
FIG. 2 is a plan view of a multi-luminous element display device.

FIG. 2 shows an embodiment of the multi-element luminous display device 14 which comprises 35 light emitting diodes 23 emitting red, blue or green light arranged in a 5×7 matrix. Different numbers of light emitting diodes 23, for instance 48, 56 or 64 emitting diodes may be arranged in a 6×8, 7×8 or 8×8 matrix respectively. Otherwise, a single array of light emitting diodes can be used to display a unidimensional mark every time a constant length of a filmstrip is advanced.

Figure 3:
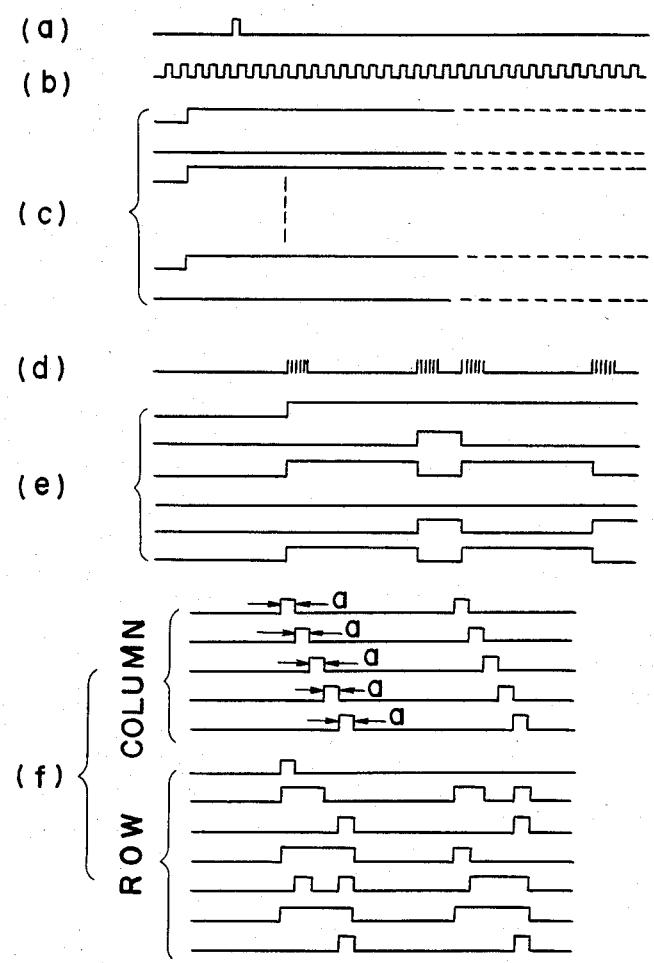
FIG. 3 is an illustration of the waveforms of the various circuits shown in FIG. 1.

In FIG. 3 illustrating waveforms for each unit of FIG. 1, the main controller 17 produces output signals which are code signals (e) representing characters, numerals, symbols, signs or the like.

As will be understood from FIG. 3 the waveforms of the signals of the units of FIG. 1, code signals (e) representing characters, numerals, symbols, signs or the like are generated from the main controller 17 corresponding to parallel signals selectively generated by the mark setting unit 19 in synchronism with signals (a) and (b) from the synchronizing signal generator 20 and the filmstrip position sensor 16. The main controller 17 also generates clock signals (d) under the influence of which the periods of time during which the LEDs emit light are controlled and which supplies the code signals (e) to the driving unit 15 which then supplies driving current (f) to the display unit 14 under the influence of the clock signals (d) so as to activate LEDs 23 to emit light.

As the synchronizing pulse generator 20, a delay pulse generating circuit is used to generate synchronizing pulses (a) under the influence of a trigger signal emitted by an external unit such as a film cutting apparatus or the like. The synchronizing pulse generation occurs, for instance when a specified time has elapsed since the trigger signal has been emitted. A pulse generator, a resolver, a perforation counter, or other position signal generators can be employed as the position sensor 16.

Figure 4:
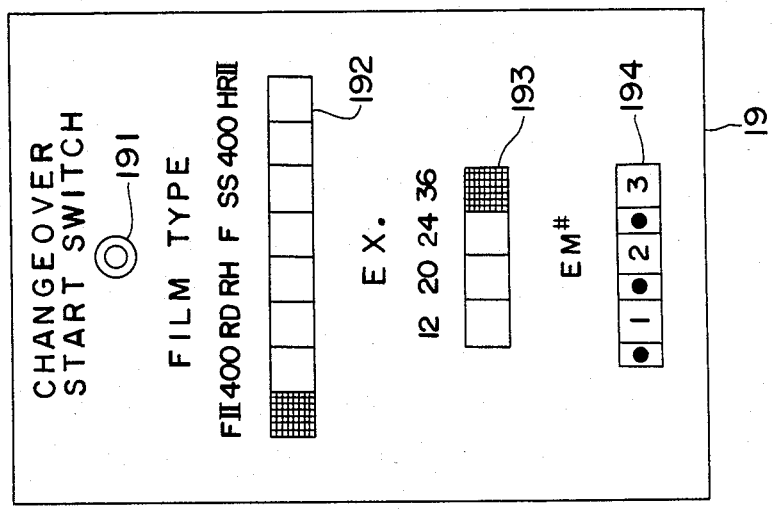
FIG. 4 is a plan view of a keyboard device for exposing marks.

FIG. 4 shows one embodiment of a keyboard device of the mark setting unit 19 for use with the present invention. Film type setting switches 192, film length setting switches (EX) 193, emulsion number setting switch (EM#) 194 are selectively operated according to the film processed and then a changeover start switch 191 is pushed, providing signals causing the multi-luminous element display unit 14 to display a desired mark to be photographed on the filmstrip as a latent image. The date the film was manufactured can be also set by the unit 19.

In the case of a different type of film, for instance a different speed of film, the exposure will be different if the display device 14 emits light for the same period of time. Accordingly, the side printing apparatus of the present invention is adapted to ensure that the period of time during which the display device emits light is changeable according to various speeds of film so as to maintain a constant exposure. That is to say, by changing the pulse width of the signal (d) in FIG. 3, the value of "a" of signals (f) for the array of luminous elements can be changed, resulting in a different period of time during which the display device emits light. The changing of the width of the signal (d) is effected by the main controller 17 under the influence of the signals (c) from the mark setting unit 19.

Figure 5:
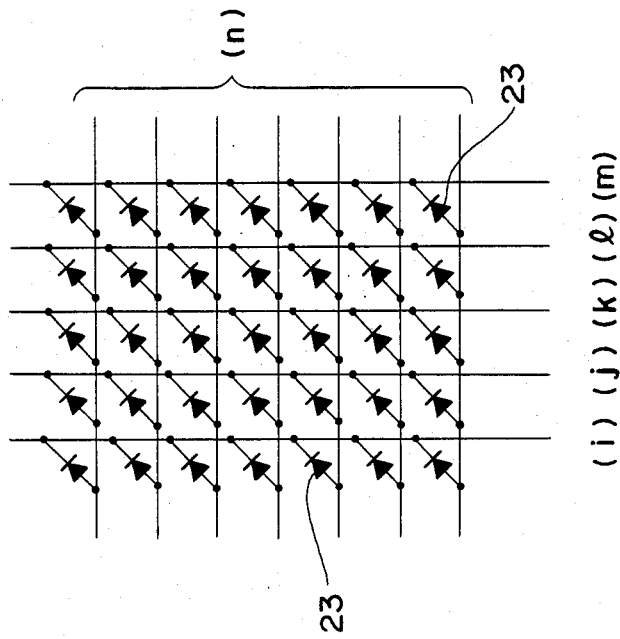
FIG. 5 is a detailed circuit arrangement of the multi-luminous element display device which is driven by a dynamic driving system.

In FIG. 5 showing a circuit arrangement of the multi-element luminous display device which is driven by a dynamic driving system, the multi-element luminous display device 14 comprises LEDs 23 which are matrix arranged 7 in the column and 5 in the row, and are respectively connected at one end to the bus lines of the columns and rows.

Figure 6:
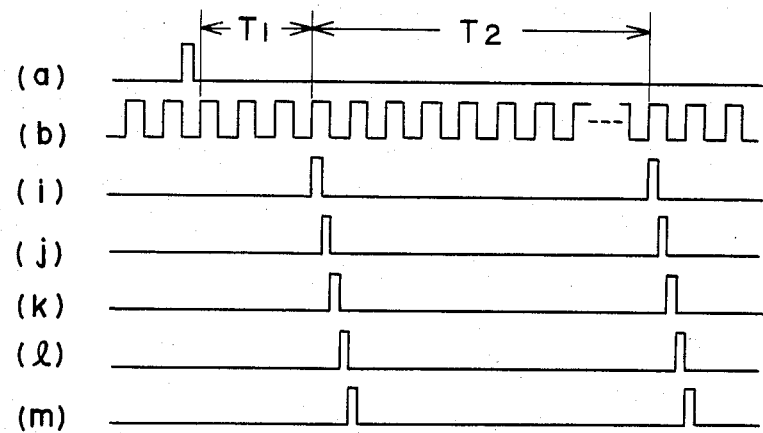
FIG. 6 is an illustration of the waveforms of driving signals of a dynamic driving system.

FIG. 6 shows the waveforms of the driving signals for the multi-element luminous display device in a dynamic driving system. The main controller 17 starts to count pulse signals emitted by the sensor 16 at the time the former receives a synchronizing signal (a). At the time the main controller 17 counts a given number $T_1$ of pulse signals, a series of signals are applied to the driving unit 15 so as to cause it to generate driving signals (i) to (m) one by one. As a result of this, LEDs 23 of the display device 14 are selectively momentarily energized to emit light. Subsequently, at the time the main controller 17 counts another given number $T_2$ of pulse signals, the display device 14 is driven to selectively momentarily energize LEDs 23 to emit light. In much the same way as described above, every time the main controller 17 counts a given number of pulse signals, the display device 14 is driven, displaying a desired mark and then photographing the displayed mark onto the film 11 as a latent image. Now, referring to FIGS. 3, 5 and 6, the signals (i) to (m) for the bus lines of the columns cause the LEDs 23 to timely emit light and, on the other hand, signals (n) for the bus lines of the rows determine the pattern of the mark to be photographed on the film.

Figure 8:
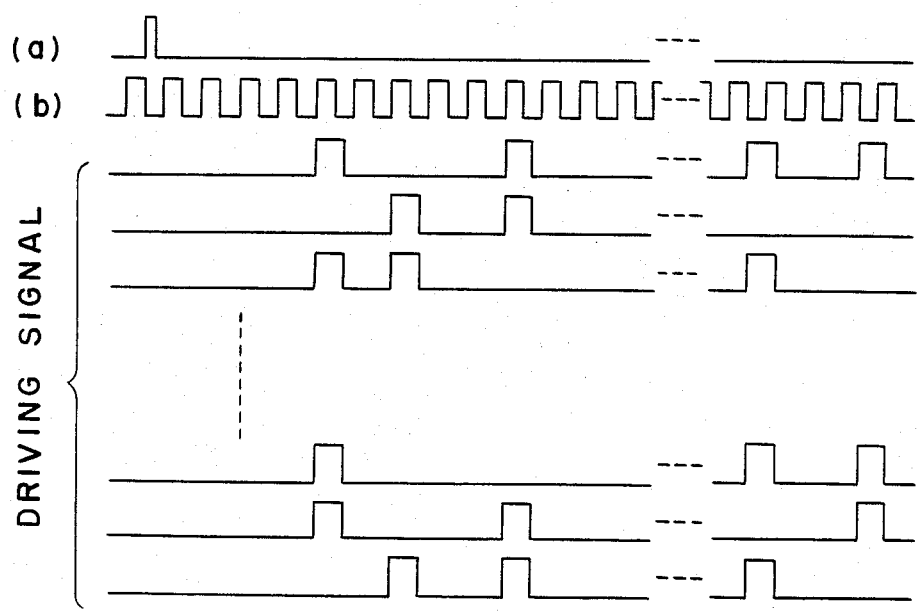
FIG. 8 is an illustration of the waveforms of driving signals in a static driving system.
Figure 7:
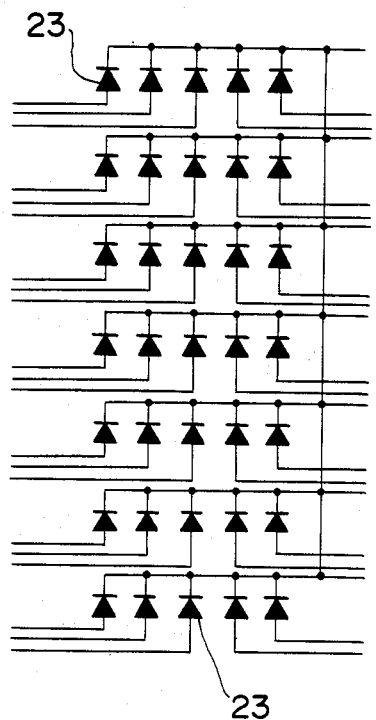
FIG. 7 is a detailed circuit arrangement of the multi-luminous element display device in a static driving system.

FIG. 7 shows a circuit arrangement of the multi-element luminous display device which is driven by a static driving system. Each LED 23 is connected at its cathode to a common bus line, while to its anode driving signals as shown in FIG. 8 are supplied.

Figure 9:
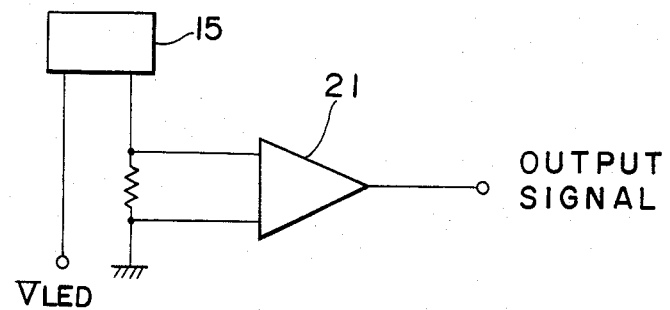
FIG. 9 is a block diagram of a part of an anomalous current detection circuit.

In FIG. 9 showing an anomalous current detection circuit, all LEDs 23 are caused to emit light one by one at certain intervals to check the current across the respective LEDs 23 between upper and lower control limits with a comparator 21 provided in the driving unit 15. When the comparator 21 detects a current exceeding the upper or lower control limit, it supplies a signal to the warning unit 18 shown in FIG. 1 through the main controller 17 so that the warning unit 18 gives the warning that there is a fault in the luminous elements. The warning unit 18 in FIG. 1 comprises a lamp or a buzzer whose warning can be manually stopped.

Although the present invention has been fully described by way of example with reference to the accompanying drawings, it is to be understood that various changes and modifications can be effected without departing from the invention, as will be apparent to those skilled in the art. Therefore, unless otherwise such changes and modifications depart from the scope of the present invention, they should be construed as being included therein.

What is claimed is:

1. A side printing apparatus for photographically exposing marks onto a moving strip of photosensitive material, said apparatus comprising:
    means for continuously advancing said strip of photosensitive material lengthwise;
    multi-element luminous display means with a two-dimensional matrix of light emitting elements for displaying a mark to be photographically exposed onto said moving photosensitive material;
    means for generating synchronizing signals under the influence of which a mark exposing cycle starts;
    means for generating position signals corresponding to the advanced length of said moving photosensitive material;
    means for generating signals indicating a desired type of mark to be photographically exposed onto said moving photosensitive material;
    main controlling means for generating signals representing said desired type of mark upon the reception of said synchronizing signal, said position signal and said indicating signal;
    means for driving said multi-element luminous display means at predetermined time intervals by signals from said main controlling means while said strip is moving to illuminate simultaneously a plurality of said light emitting elements in a pattern unique to said mark; and
    a lens system for forming a reduced image of said mark displayed on said multi-element luminous display means on said moving photosensitive material.

2. A side printing apparatus as defined in claim 1, said multi-luminous element display means comprising a large number of light emitting elements arranged in columns and rows at regular intervals.

3. A side printing apparatus as defined in claim 2, further comprising a comparator for detecting current crossing said light emitting elements exceeding predetermined upper and lower limits of current and warning means activated under the influence of output signals from said comparator.

4. A side printing apparatus as defined in claim 3, said light emitting elements being light emitting diodes.

5. A side printing apparatus as defined in claim 4, said indication signal generating means including switches for setting a type of film, a film length and an emulsion number of film which enable displaying various types of marks on said multi-element luminous display means.

6. A side printing apparatus as defined in claim 4, said position signal generating means being a rotary encoder which rotates simultaneously with the advancement of said photosensitive material to generate pulse signals.

7. A side printing apparatus as defined in claim 4, said light emitting diodes being so arranged as to be driven by a dynamic driving system.

8. A side printing apparatus as defined in claim 4, said light emitting diodes being so arranged as to be driven by a static driving system.

9. A side printing apparatus as defined in claim 6, said warning means being a lamp.

10. A side printing apparatus as defined in claim 4, said warning means being a buzzer.

11. A side printing method for photographically exposing marks onto a moving strip of photosensitive material, comprising the steps of:
    continuously advancing a said strip of photosensitive material lengthwise;
    generating position signals corresponding to the advanced length of said photosensitive material;
    displaying a mark to be photographed onto said moving photosensitive material in response to said position signals by using a two dimensional multi-element luminous display unit with a plurality of light emitting elements arranged in a matrix by simultaneously illuminating a plurality of said light emitting elements in a pattern unique to said mark; and
    forming the image of said displayed mark on said moving photosensitive material through a reduction lens system.

12. A side printing method as defined in claim 11, said light emitting elements being light emitting diodes.

* * * * *